(12) United States Patent
Feuerecker

(10) Patent No.: US 6,389,840 B2
(45) Date of Patent: May 21, 2002

(54) DEVICE FOR COOLING AN INTERIOR OF A MOTOR VEHICLE

(75) Inventor: Guenther Feuerecker, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/838,282

(22) Filed: Apr. 20, 2001

(30) Foreign Application Priority Data

Apr. 20, 2000 (DE) .......................... 100 19 580

(51) Int. Cl.$^7$ ............................... F25D 17/02
(52) U.S. Cl. ........................... 62/434; 62/435
(58) Field of Search .................... 62/434, 435

(56) References Cited

U.S. PATENT DOCUMENTS 5,421,169 A * 6/1995 Benedict ............... 62/244
6,112,543 A   9/2000 Feuerecker et al. ...... 62/430

FOREIGN PATENT DOCUMENTS

JP    2000 241037  *  9/2000  ........... F25B/13/00

* cited by examiner

Primary Examiner—William E. Tapolcai
Assistant Examiner—Mohammad M. Ali
(74) Attorney, Agent, or Firm—Foley & Lardner

(57) ABSTRACT

The invention relates to a device for cooling a vehicle interior with a secondary circuit (26) for transferring the cold produced in an evaporator (24) of a primary refrigerating circuit (14) of a refrigerating unit (12) by means of a refrigerating medium to at least one heat transfer device (34) for cooling the air to be fed into the vehicle interior, the secondary circuit (26) having a main circuit (36) and an auxiliary circuit (40) containing the heat transfer device (34), which are coupled by a four-way valve (56), by means of which an adjustable proportion of the flow of refrigerating medium can be diverted from the main circuit (36) and fed into the auxiliary circuit (40). In order to provide an improved device for cooling, in particular one that can be produced at a more reasonable cost, it is proposed that an inner heat exchanger (80) should be provided in the auxiliary circuit (40), allowing heat exchange to take place between a feed (60) and a return (62). This makes it possible to dispense with the use of a circulation pump in the auxiliary circuit.

16 Claims, 2 Drawing Sheets

DEVICE FOR COOLING AN INTERIOR OF A MOTOR VEHICLE

BACKGROUND OF THE INVENTION

The invention relates to a device for cooling an interior of a motor vehicle.

A device of this kind for interior cooling is known from DE 198 38 880 and has a primary refrigerating circuit, which comprises a compressor, a condenser, an expansion element and an evaporator. The evaporator transfers the cold (i.e., a temperature conditioned flow mass such as vapor) produced in the primary circuit by the evaporator to a refrigerating medium in a secondary circuit. The secondary circuit has a main circuit and an auxiliary circuit, which are coupled by a four-way valve, allowing an adjustable proportion of the flow of refrigerating medium to be diverted from the main circuit and fed into the auxiliary circuit. Arranged in the auxiliary circuit is a heat transfer device, which is used to cool the air to be fed to the vehicle's interior.

Also provided in the auxiliary circuit is a circulation pump. This ensures that there is always a high mass flow in the auxiliary circuit comprising the four-way valve, the feed, the heat transfer device and the return, it being possible to control the high mass flow independently of the mass flow of refrigerating medium in the main circuit, i.e. independently of the position of the four-way valve. If, for example, only a low refrigerating capacity is required, the four-way valve is set in such a way that only a small proportion of the very cold mass flow of refrigerating medium is diverted from the main circuit and fed into the auxiliary circuit. This small proportion is fed back into the main circuit via the return. If there were no circulation pump, the mass flow of refrigerating medium in the auxiliary circuit would be low in accordance with the proportion fed in through the four-way valve, and the refrigerating medium would flow only slowly through the heat transfer device. This would have the disadvantage that the refrigerating medium, which is very cold in the feed, could cause icing of the heat transfer device, at least in the region of an inlet of the heat transfer device. The air cooled by the heat transfer device would at least be very "stratified", i.e. exhibit a large temperature difference over the cross section of an air outlet region of the heat transfer device. The high susceptibility to gradients that causes this stratification and icing, i.e. a large temperature gradient of the refrigerating medium in the auxiliary circuit, is avoided by the high mass flow that can be achieved by means of the circulation pump. However, an additional circulation pump in the auxiliary circuit is very costly since it leads to costs for materials and requires a suitable means of control.

Based on this prior art, it is the object of the invention to provide an improved device for cooling an interior, in particular one that can be produced at lower cost.

SUMMARY OF THE INVENTION

In accomplishing the objects of the invention, there has been provided, according to one aspect of the invention, a device for cooling a vehicle interior comprising a cooling device for cooling an interior of a vehicle, comprising:

a primary refrigerating circuit comprising an evaporator for providing a temperature conditioned flow; and a secondary circuit operatively coupled to said primary refrigerating circuit, said secondary circuit carrying a refrigerating medium to which the temperature conditioned flow from said evaporator is provided, said secondary circuit comprising:

a main circuit;

an auxiliary circuit operatively coupled with said main circuit; and an adjustable valve for controlling flow of the refrigerating medium between said main circuit and said auxiliary circuit, wherein said auxiliary circuit comprises (i) at least one heat transfer device for receiving said refrigerating medium and cooling air to be feed into the vehicle interior, and (ii) an inner heat exchanger operatively coupled with said heat transfer device for increasing the temperature of the refrigerating medium provided to said heat transfer device.

According to another aspect of the present invention, there is provided a device for cooling comprising a vehicle air conditioning unit comprising:

a cooling device comprising:

a primary refrigerating circuit comprising an evaporator for providing a temperature conditioned flow; and a secondary circuit operatively coupled to said primary refrigerating circuit, said secondary circuit carrying a refrigerating medium to which the temperature conditioned flow from said evaporator is provided, said secondary circuit comprising:

a main circuit;

an auxiliary circuit operatively coupled with said main circuit; and an adjustable valve for controlling flow of the refrigerating medium between said main circuit and said auxiliary circuit, wherein said auxiliary circuit comprises (i) at least one heat transfer device for receiving said refrigerating medium and cooling air to be feed into the vehicle interior, and (ii) an inner heat exchanger operatively coupled with said heat transfer device for increasing the temperature of the refrigerating medium provided to said heat transfer device.

In accordance with an additional aspect of the invention, there is provided a method of air conditioning air in a vehicle, comprising the steps of:

providing a temperature conditioned flow from an evaporator of a primary refrigerating circuit to a refrigerating medium flowing in a secondary refrigerating circuit;

feeding said refrigerating medium to an inner heat exchanger positioned in said secondary circuit;

heating said refrigerating medium by said inner heat exchanger;

providing said heated refrigerating medium via a feed to a heat transfer device; and cooling said refrigerating medium by said heat transfer device.

Further objects, features and advantages of the present invention will become apparent from the detailed description of preferred embodiments that follows when considered together with the accompanying drawings.

BRIEF DESCRIPTION OF THE DRAWINGS

The invention is explained in detail below with reference to the exemplary embodiments and with reference to the accompanying drawings, in which.

DETAILED DESCRIPTION OF THE PREFERRED EMBODIMENTS

Figure 1:
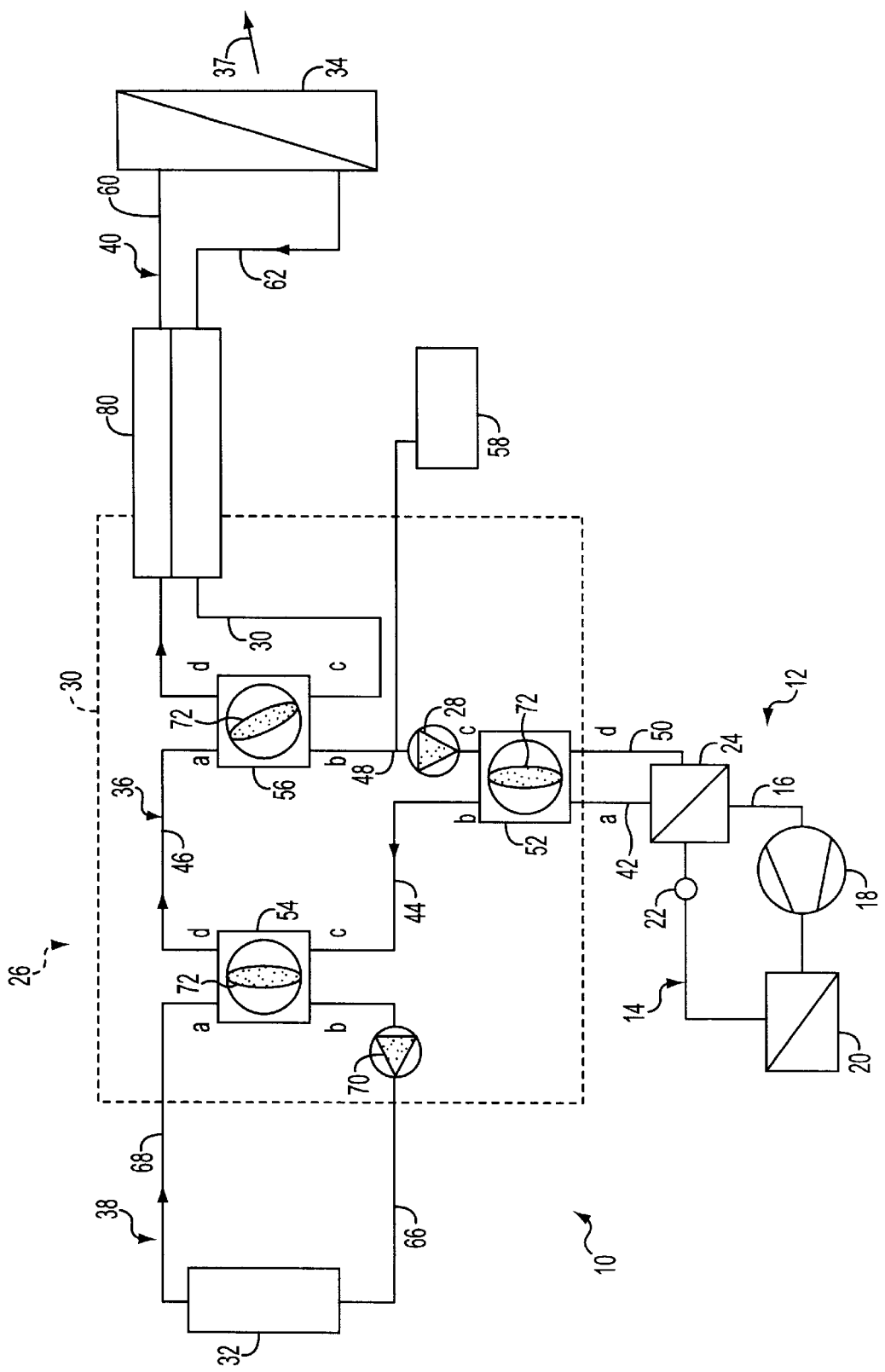
FIG. 1 shows a schematic representation of a first exemplary embodiment of a device according to the invention for cooling a motor-vehicle interior.

According to the invention, an inner heat exchanger is provided in the auxiliary circuit, allowing heat exchange to take place between an inlet and a return. There is no longer a circulation pump in the auxiliary circuit, thus allowing corresponding cost savings. By virtue of the inner heat exchanger, the refrigerating medium is heated in the feed. A higher flow rate in the auxiliary circuit is therefore set in the four-way valve in order to achieve the predetermined air temperature downstream of the heat transfer device. Because of the higher flow rate, icing and stratification of the air can be avoided. Before the refrigerating medium is returned to the secondary circuit, it is cooled down by the same amount as it was heated in the feed.

However, this increase in the feed temperature, which is desired in a part-load operation, leads to unwanted losses of capacity in full-load operation of the heat transfer device, when the auxiliary circuit is fully coupled to the main circuit and the flow of refrigerating medium in the main circuit is passed completely through the auxiliary circuit. To minimize these losses of capacity, a refinement of the invention makes provision for the return to have a branch between the heat transfer device and the inner heat exchanger, and for the first arm of the branch to open into the four-way valve, bypassing the inner heat exchanger, and for the second arm to be passed through the inner heat exchanger and to open directly from the latter into the main circuit, downstream of the four-way valve. The majority of the flow of refrigerating medium will then flow via the first arm and bypass the inner heat exchanger owing to the inherent flow resistance of the inner heat exchanger, with the result that little heat exchange takes place and the temperature in the feed is raised only slightly.

To maximize this effect, the flow resistance on the return side of the inner heat exchanger is significantly greater than the flow resistance of the first arm of the return in an advantageous refinement of the invention.

In the part-load operation, i.e. when only a small proportion of the flow of refrigerating medium is diverted into the auxiliary circuit, the four-way valve is set in such a way that, on the one hand, only the small proportion is diverted and, moreover, on the other hand, only a small amount of the flow of refrigerating medium can be fed back into the main circuit at the four-way valve. This means that the flow resistance of the first arm is increased owing to the four-way valve, and most of the refrigerating medium in the return flows via the second arm and hence through the inner heat exchanger and directly into the main circuit. But this means that the desired inner heat exchange between the feed and return is achieved in the case of small flows of refrigerating medium in the auxiliary circuit.

Turning now to the drawings, a device 10 according to the invention for cooling a motor-vehicle interior has a refrigerating unit 12 that contains a primary refrigerating circuit 14 comprising a compressor 18, a condenser 20, an expansion element 22 and an evaporator 24 connected by refrigerant lines 16. A refrigerant dryer and a refrigerant collector should of course be provided in a known manner (not shown) in the primary refrigerant circuit 12.

The evaporator 24 is designed as a refrigerant/liquid heat transfer device and can be supplied, on the one hand, with the refrigerant in the primary refrigerating circuit 14 and, on the other hand, with a refrigerating medium circulating in a secondary circuit 26, allowing the cold produced in the evaporator 24 to be transferred to the refrigerating medium in the secondary circuit 26. The temperature of the refrigerating medium cooled down in this way can be well below 0° C.

The refrigerating medium can be any suitable refrigerating medium as specific to a given application. For example, a water/glycol mixture of the kind customarily used in engine cooling circuits is preferably used. Circulation of the refrigerating medium in the secondary circuit 26 is ensured by means of a circulation pump 28.

The secondary circuit 26 furthermore has a control and distribution unit 30, by means of which a first adjustable proportion of the flow of refrigerating medium can be fed to an optionally provided cold storage device 32 and a second, likewise adjustable, proportion of the flow of refrigerating medium can be fed to a heat transfer device 34.

The heat transfer device 34 is used to cool air that can be fed to a vehicle interior to provide air conditioning for the vehicle interior. The conditioned air is indicated by an arrow 37. A housing for guiding the air and further details of the guidance and conveyance of the air, e.g. an air guide housing, blowers, air flaps and the like, are normally included but have not been illustrated for the sake of clarity. The heat transfer device 34 can be part of an air conditioner arranged, for example, in a dashboard of the motor vehicle and can there replace the otherwise customary evaporator.

The secondary circuit 26 illustrated in FIG. 1 has a main circuit 36 and two auxiliary circuits 38 and 40. The main circuit 36 is made up of refrigerating-medium lines 42, 44, 46, 48 and 50, line 48 containing the circulation pump 28. The individual lines 42 to 50 of the main circuit 36 are connected to one another by, for example, four-way valves 52, 54 and 56, the function and mode of operation of which is described below. In this exemplary embodiment, the control and distribution unit 30 essentially contains the four-way valves 52, 54, 56, the circulation pump 28 and the corresponding refrigerating-medium lines 44, 46, 48. An expansion tank 58 is provided to ensure that there is always a sufficient quantity of refrigerating medium in the secondary circuit 26 and that changes in volume when the refrigerating medium is warmed or cooled can be balanced out. Different connection points for the expansion tank 58 and the pump 28 from those illustrated in FIG. 1 are also possible.

Figure 2:
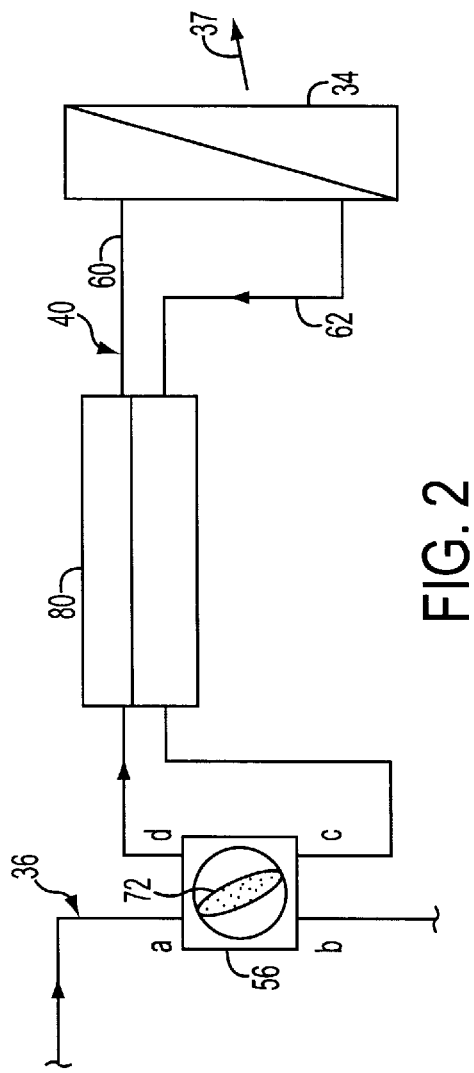
FIG. 2 shows the auxiliary circuit from FIG. 1.

Via the four-way valve 56, the auxiliary circuit 40, which is shown separately in FIG. 2, can be coupled to the main circuit 36 or separated from it. The auxiliary circuit 40 comprises a feed 60, the heat transfer device 34 and a return 62. The feed 60 and the return 62 are passed through an inner heat exchanger 80, with the result that heat exchange takes place between the feed 60 and the return 62 and the temperature of the refrigerating medium in the feed 60 is raised. To obtain the required capacity from the heat transfer device 34, a higher flow rate must be set as compared to a circuit without an inner heat exchanger 80. The higher flow rate reduces the susceptibility to gradients in the auxiliary circuit 40.

Each of the four-way valves 52, 54 and 56 has a rotary slide 72, and as a function of the angular position of the slide four ports a, b, c and d of each four-way valve can be connected to one another in a suitable manner, preferably in an infinitely variable manner, thus allowing different proportions of the flow of refrigerating medium to flow from a to b and/or a to d and/or d to c and from c to b in the four-way valve 56, for example, depending on the position of the rotary slide.

Via the four-way valve 56, the auxiliary circuit 40 can be coupled to the main circuit 36, which contains the cooled refrigerating medium, and the extent of this coupling can vary depending on requirements in any given application. In the position of the four-way valve 56 shown in FIG. 2, the ports a and b are connected to one another, as are ports c and d, and a proportion of the refrigerating medium can furthermore flow from a to d, and, in a corresponding manner, from c to b, the proportion of the flow of refrigerating medium transferred depending, as has been described, on the angular position of the rotary slide 72 of the four-way valve 56. This proportion of the flow of refrigerating medium diverted from the main circuit 36 is fed back to the main circuit 36 in the transfer from c to b.

With this constitution, the required refrigerating capacity of the heat transfer device 34 can be adjusted up to the maximum possible refrigerating capacity. The maximum possible refrigerating capacity is reached when the rotary slide 72 of the four-way valve 56 is in a position in which only ports a and d and ports b and c are connected to one another, respectively, and the entire flow of refrigerating medium is passed through the auxiliary circuit 40. However the maximum refrigerating capacity of the heat transfer device 34 (full-load operation) is reduced by the inner heat exchange between the feed and return.

Figure 3:
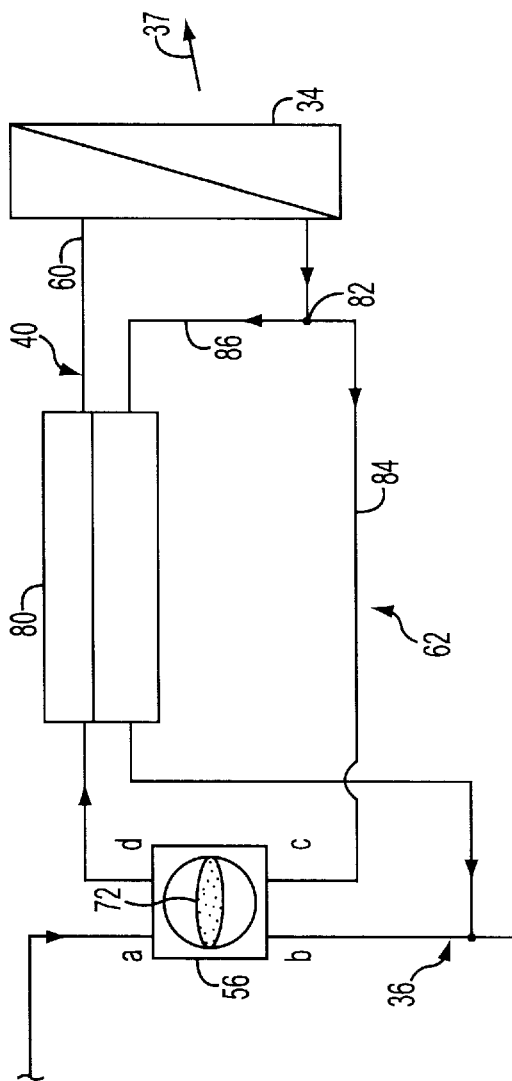
FIG. 3 shows another embodiment of the auxiliary circuit according to the invention.

In a preferred refinement of the auxiliary circuit 40, which is illustrated in FIG. 3, a higher maximum refrigerating capacity can be achieved. In this embodiment, the return 62 has a branch 82 between the heat transfer device 34 and the inner heat exchanger 80. A first arm 84 of the branch 82 opens directly into the four-way valve 56 at port c, bypassing the inner heat exchanger 80. A second arm 86 is passed through the inner heat exchanger 80 and opens directly from the heat exchanger 80 into the main circuit 36, more specifically downstream of the four-way valve 56.

The flow resistance on the return side of the inner heat transfer device 80 is significantly greater than the flow resistance of the first arm, with the result that, when the four-way valve 56 is set to full refrigerating capacity, as illustrated in FIG. 3, the majority of the flow of refrigerating medium will flow through the first arm 84, bypassing the inner heat exchanger 80, thereby increasing the maximum refrigerating capacity compared with the embodiment in FIG. 2.

When the four-way valve 56 is set to a low refrigerating capacity (part-load operation), i.e. when only a small proportion of the flow of refrigerating medium is diverted into the auxiliary circuit 40, and the four-way valve 56 is set in such a way that only a small proportion can flow from a to d and from c to b, the flow resistance during transfer from c to b will be relatively high, with the result that in this case the flow of refrigerating medium in the return 62 will not flow via the first arm 84 but via the second arm 86, thereby ensuring a desired increase in the heat exchange in the inner heat transfer device 80 during part-load operation in this embodiment too.

To illustrate and explain the mode of operation of the device according to the invention in the embodiment shown in FIG. 3 in full-load operation and in part-load operation, typical values for temperature and flow rate are given below, though the temperature and flow rate can be set accordingly for any specific application:

|  | Full load Cooling a flow of air of 10 kg/min from 40° C. to 14° C. | Part load Cooling a flow of air of 3 kg/min from 30° C. to 7° C. |
| --- | --- | --- |
| Flow rate in the main circuit | 800 l/h | 800 l/h |
| Temperature of refrigerating medium in the main circuit upstream of the valve | 10° C. | −8° C. |
| Temperature in the feed upstream of inner heat exchanger | 10° C. | −8° C. |
| Temperature in the feed downstream of inner heat exchanger | 10.1° C. | 0.3° C. |
| Flow rate in the feed | 800 l/h | 62 l/h |
| Temperature in the return upstream of inner heat exchanger | 14° C. | 22° C. |
| Temperature in the return in the second arm downstream of inner heat exchanger | 10.2° C. | −5° C. |
| Flow rate in the second arm | 17 l/h | 19 l/h |

The accumulator auxiliary circuit 38 can be connected to the main circuit 36 in the same way by means of the four-way valve 54 and comprises a refrigerant-medium line 66, a cold storage device 32 and a refrigerant-medium line 68. As a further option, though not necessary, a third circulation pump 70 can be provided in the accumulator auxiliary circuit 38 to enable a particular mass flow to be maintained in the accumulator auxiliary circuit 38.

The disclosure of German Patent Application No. 100 19 580.6, filed Apr. 20, 2000 is hereby incorporated by reference in its entirety.

The foregoing embodiments have been shown for illustrative purposes only and are not intended to limit the scope of the invention which is defined by the claims.

I claim:

1. A cooling device for cooling an interior of a vehicle, comprising:
   a primary refrigerating circuit comprising an evaporator for providing a temperature conditioned flow; and
   a secondary circuit operatively coupled to said primary refrigerating circuit, said secondary circuit carrying a refrigerating medium to which the temperature conditioned flow from said evaporator is provided, said secondary circuit comprising:
   a main circuit;
   an auxiliary circuit operatively coupled with said main circuit; and
   an adjustable valve for controlling flow of the refrigerating medium between said main circuit and said auxiliary circuit,
   wherein said auxiliary circuit comprises (i) at least one heat transfer device for receiving said refrigerating medium and cooling air to be feed into the vehicle interior, and (ii) an inner heat exchanger operatively coupled with said heat transfer device for increasing the temperature of the refrigerating medium provided to said heat transfer device.

2. The cooling device of claim 1, wherein said adjustable valve is a four-way valve.

3. The cooling device of claim 2, wherein said adjustable, four-way valve further comprises a rotary slide.

4. The cooling device of claim 2, wherein said auxiliary circuit further comprises a feed for flow of said refrigerating medium from said inner heat exchanger to said heat transfer device, and a return for flow of said refrigerating medium from said heat transfer device to said inner heat exchanger.

5. The cooling device of claim 4, wherein said return comprises a first branch arm bypassing said inner heat exchanger and opening to said adjustable valve.

6. The cooling device of claim 5, wherein said return further comprises a second branch arm passing to said inner heat exchanger, and bypassing said adjustable valve and opening into said main circuit downstream of said adjustable valve.

7. The cooling device of claim 6, wherein a flow resistance in said second branch arm leading to said inner heat exchanger is significantly greater than a flow resistance in said first branch arm.

8. The cooling device of claim 1, wherein said auxiliary circuit further comprises a return line for returning refrigerant from said auxiliary circuit to said main circuit.

9. The cooling device of claim 8, wherein said return line connects said heat transfer device to said main circuit and passes through said inner heat exchanger.

10. The cooling device of claim 9, wherein said return line comprises a first branch that bypasses said inner heat exchanger and opens directly into said adjustable valve.

11. The cooling device of claim 10, wherein said return line further comprises a second branch that passes through said inner heat exchanger, bypasses said adjustable valve and opens directly into said main circuit.

12. The cooling device of claim 1, wherein said secondary circuit further comprises a control and distribution unit for controlling flow of refrigerating medium in said secondary circuit, comprising at least one circulation pump for circulating said refrigerating medium.

13. The cooling device of claim 1, wherein said secondary circuit further comprises an expansion tank for controlling a quantity of refrigerating medium in said secondary circuit and controlling volume changes based on temperature changes in said refrigerating medium.

14. The cooling device of claim 1, further comprising a second auxiliary circuit operatively coupled to said main circuit, said second auxiliary circuit comprising a cold storage device.

15. The cooling device of claim 1, wherein said primary circuit further comprises:

a compressor operably coupled to the output of said evaporator;

a condenser operably coupled to the output of said compressor; and an expansion element operably coupled to the output of said condenser.

16. A vehicle air conditioning unit comprising:

a cooling device comprising: a primary refrigerating circuit comprising an evaporator for providing a temperature conditioned flow; and a secondary circuit operatively coupled to said primary refrigerating circuit, said secondary circuit carrying a refrigerating medium to which the temperature conditioned flow from said evaporator is provided, said secondary circuit comprising:

a main circuit;

an auxiliary circuit operatively coupled with said main circuit; and an adjustable valve for controlling flow of the refrigerating medium between said main circuit and said auxiliary circuit, wherein said auxiliary circuit comprises (i) at least one heat transfer device for receiving said refrigerating medium and cooling air to be feed into the vehicle interior, and (ii) an inner heat exchanger operatively coupled with said heat transfer device for increasing the temperature of the refrigerating medium provided to said heat transfer device.

* * * * *